UNITED STATES PATENT OFFICE.

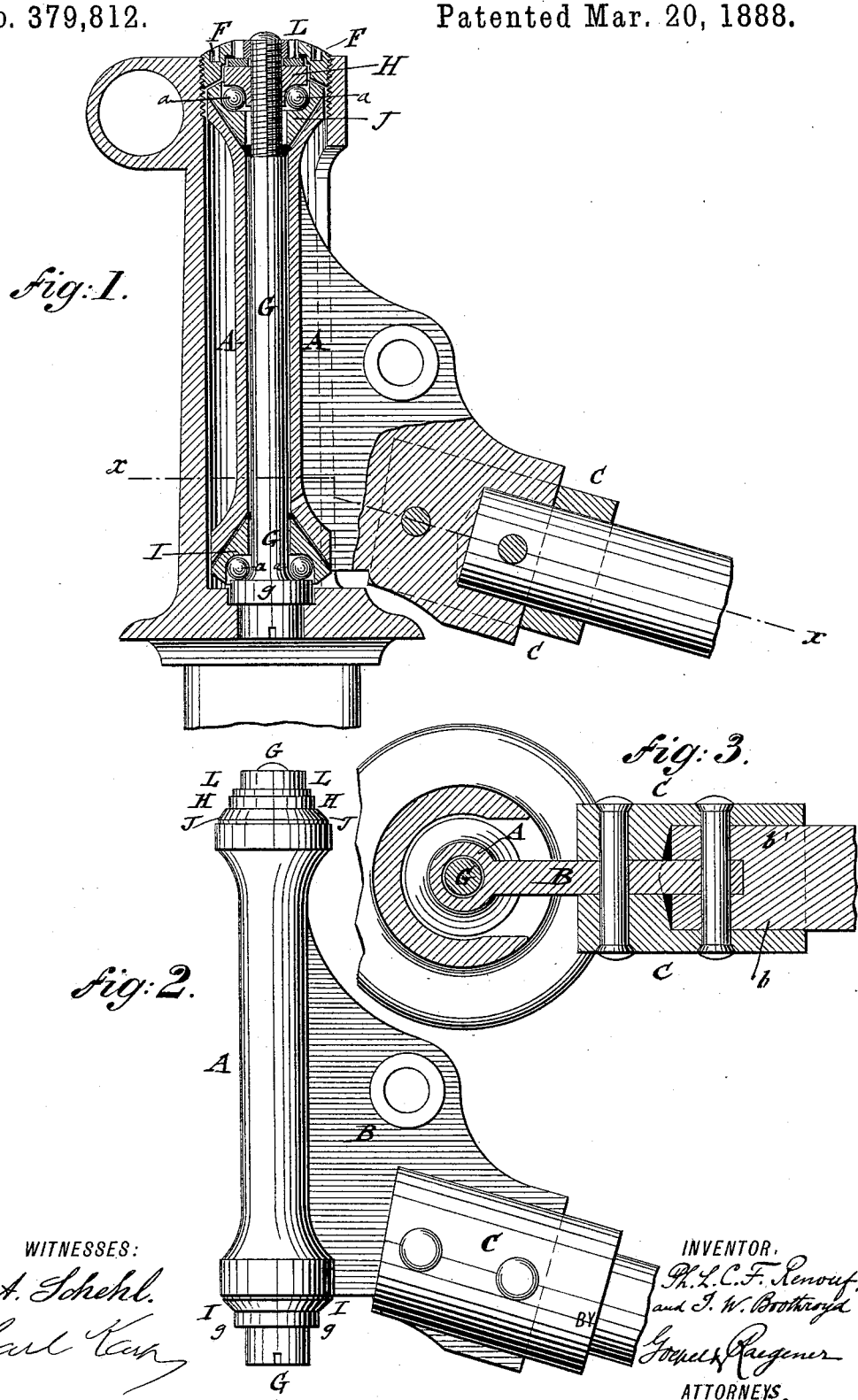

PHILIPP L. C. F. RENOUF AND ISAAC WATTS BOOTHROYD, OF LONDON, COUNTY OF MIDDLESEX, ENGLAND.

VELOCIPEDE.

SPECIFICATION forming part of Letters Patent No. 379,812, dated March 20, 1888.

Application filed September 8, 1887. Serial No. 249,090. (No model.) Patented in England March 9, 1886, No. 3,294.

*To all whom it may concern:*

Be it known that we, PHILIPP L. C. F. RENOUF and ISAAC WATTS BOOTHROYD, of London, in the county of Middlesex, Kingdom of England, have invented certain new and useful Improvements in Velocipedes, (for which Letters Patent have heretofore been granted to us in England, No. 3,294, dated March 9, 1886,) of which the following is a specification.

This invention relates to improvements in the steering-necks of bicycles, tricycles, and similar vehicles, and has for its object an improved construction of such necks, whereby greater durability and ease of motion are attained, together with lessened friction and increased simplicity, strength, and convenience of handling.

The invention consists in certain improvements in the steering-neck of velocipedes, the neck being hollow and provided with cups or bushes, which, in connection with a spindle having collars, retain hardened anti-friction balls or rollers. The anti-friction devices are adjustable in the neck and attached thereto before the steering-neck is applied to the head.

The invention consists, further, of the combination, with the flat portion or plate of the steering-neck, of a recessed boss or socket that is adjusted on said plate to the degree of inclination required by the backbone to be used, and then secured by pinning and brazing in the usual manner.

In the accompanying drawings, Figure 1 represents a vertical section of our improved steering-neck, showing it in position in the head. Fig. 2 is a side view of the steering-neck as detached from the head; and Fig. 3 is a vertical transverse section on line $x\ x$, Fig. 2, showing the connection of the flat portion of the steering-neck with the boss for the backbone.

Similar letters of reference indicate corresponding parts.

The steering-neck is so constructed as to form within itself a self-contained and easily-adjustable anti-friction bearing with interchangeable parts, as shown in Figs. 1 and 2. The portion of the neck known as the "spindle" or "stem" is made hollow by boring it completely through in a vertical direction, or in a direction in line with its longer axis. The ends of the hollow part A are conically recessed and provided with hardened conical bushes or cups I and J, which form the bearing-surface for the balls or rollers $a$ to be introduced. A spindle or pin, G, with a fixed cone or collar, $g$, on its lower end and a movable adjusting collar or cone, H, on its upper end, is inserted within the hollow part A, and a row of hardened spherical balls, $a$, placed in each of the bearing-cups I and J, after which the movable and threaded cone H is screwed down on the spindle G to the proper degree of tightness. The parts are then securely locked against loosening by a nut, L, a D-washer being interposed between this nut and the cone H to prevent nut L from carrying the cone H with it.

We preferably make the bearing-cups I and J separate pieces and place them loosely in the coned recesses, although they may be fastened therein by soldering or otherwise. By making these cups separate we secure the great advantage of avoiding the necessity of hardening any portion of the neck, thus facilitating its manufacture and lessening the liability of fracture in use.

The parts having been placed in their respective positions, as described, the neck is introduced into the head or corresponding part of the velocipede, the lower end of the spindle G dropping into a suitable recess made for it. The whole neck is then firmly secured in place within the head by turning down a hollow nut, F, which screws into an interior thread within the head, and is made to fit closely down upon the parts fixed to the end of the spindle G without coming in contact with the neck itself or the bearing-cups. For greater security against accidental loosening we prefer to make a difference in pitch between the threads respectively on the spindle G and nut F. The locking of the spindle G to the hollow part of the neck and their adjustment could also be effected at the lower end of the part A; or coned rollers could be used instead of balls, the bearing-surfaces being given the proper shape to receive them; or, in lieu of balls and rollers, simple male cones could be used to form the bearing-surfaces; or the neck could be cut away to form projecting lugs to receive cups I and J, the spindle G and other parts being retained and used, as described; or any form of head could be used which retains the essentials of a support for the bearings within the neck. Modifications such as these, and others not material, could be made without departing from the spirit and essence of our invention.

The advantages of an anti-friction bearing for steering purposes are known and obvious, as it provides a ready means of taking up all looseness and greatly increases the ease of movement and durability of the parts. By making the neck itself contain the bearing complete and the head serve only as a place of fastening and support, our invention has the following advantages:

The head and neck can be separated and united again at will without disturbing the adjustment of the bearing or removing the balls or rollers from their places and without danger of losing them. The bearing is practically dust-proof, since dust and dirt must work upward to reach the bearing-surfaces, instead of downward, as with all other forms of bearings yet devised for the steering of bicycles and similar vehicles.

The adjustment and locking of the bearing can be effected before putting the neck in place within the head, whereas if such adjustment of an anti-friction steering be attempted after putting head and neck in position with reference to each other, as must be done with all other forms of steering heretofore devised, the leverage obtained by turning the handles or like parts involves great liability of screwing down too hard upon the balls or rollers, and hence of causing them to split or chip in use.

An incidental advantage of our method is, also, that the mode of securing the parts in their places makes any loosening while in use impossible. The hardened cups I and J are so firmly supported and self-centered that they are not liable to crack, and even if the spindle G should break off the security and operation of the parts would not be disturbed.

Heretofore the entire neck, including the flat portion or plate and the round or oval boss, by which the connection of the neck with the tubular backbone or perch is made, has been formed of a single piece. We propose to form the hollow part A and the flat portion or plate B in one piece, but separate from the boss C, the latter being so bored out as to form a cylindrical or oval socket, $b$, and provided with a recess, $b'$, to receive the flattened part of the neck, as shown in Fig. 3. When the flat portion or plate B has been inserted in the recess $b'$ of the boss C into the required position, the two pieces are united to each other and to the backbone or proper part of the frame-work by pinning or brazing, or both.

It is obvious that the boss portion of the neck requires to be at a varying angle with the remaining portion of the neck, according as the neck and backbone, when joined and completed, are to be placed above a larger or smaller wheel, or according as the spindle of the neck is to stand more or less vertical; and it is equally obvious that the method of making the entire neck in one piece does not conveniently suit these varying cases.

By our method it is necessary only to place the recessed boss in position to suit the wheel or frame intended, and then secure it in position by inserting a single pin. The brazing may now be done, one or more additional pins being inserted, if desired, and the parts may be finished to the exact outline desired. This method secures a better fit of the parts, excludes superfluous metal, saves labor, and improves the strength of the joint. In lieu of the slot, as shown, a lap or other method of uniting the two parts of the neck may be used.

We are aware that steering-necks have heretofore been supported in anti-friction bearings of the head of the vehicle. We are also aware that steering-necks have been provided with a vertical bore for the spindle, and do not claim these features, broadly; but we are not aware that a steering-neck containing a spindle and anti-friction bearings for said spindle, said neck being detachable from the head with the spindle and anti-friction bearings, and separately adjustable when so detached, has been used.

Having thus described the nature of our invention and the mode of applying it, we claim—

1. A steering-neck containing a spindle and hardened spherical balls or conical rollers, said neck with its contained spindle and balls or rollers being detachable from the head of the vehicle, and separately adjustable when so detached, substantially as described.

2. The combination of the hollow part or sleeve of a steering-neck, provided with recesses within said hollow part, with hardened bearing-cups fitted into said recesses, so as to be self-centering, substantially as described.

3. The combination of a steering-neck having a hollow part or sleeve, hardened bearing cups or bushes in said hollow part, a spindle having a fixed and an adjustable cone or collar, anti-friction balls or rollers interposed between the cups and cones, and means for adjusting the cones to the balls or rollers, substantially as described.

4. The combination, with the head of the vehicle, of a steering-neck having a hollow part, hardened cups seated in recesses of said part, a spindle having a fixed and an adjustable cone or collar, hardened balls or rollers interposed between said cups and cones, means for screwing up one or both cones, and a lock-nut for securing the steering-neck within the head of the fork, substantially as set forth.

5. A steering-neck for bicycles and similar vehicles, constructed with a flat portion or plate, and a boss or portion for attaching the neck to the backbone or frame of the vehicle, said boss being formed separate from the neck and recessed and united to the plate and to the
5 backbone by pinning, brazing, or other suitable means, substantially as described.

In testimony that we claim the foregoing as our invention we have signed our names in presence of two subscribing witnesses.

PHILIPP L. C. F. RENOUF.
ISAAC WATTS BOOTHROYD.

Witnesses:
PERCY A. RIX,
E. C. DIMSLOW.